United States Patent [19]

Lemke

[11] Patent Number: 4,987,714
[45] Date of Patent: Jan. 29, 1991

[54] METHOD FOR INSTALLING A ROOF FASTENER

[76] Inventor: Stuart H. Lemke, 349 River Bluff, Mosinee, Wis. 54455

[21] Appl. No.: 385,256

[22] Filed: Jul. 25, 1989

Related U.S. Application Data

[63] Continuation-in-part of Ser. No. 236,542, Aug. 25, 1988, abandoned, and a continuation-in-part of Ser. No. 236,666, Aug. 25, 1988, Pat. No. 4,834,600.

[51] Int. Cl.⁵ .............................................. E04D 5/14
[52] U.S. Cl. ........................................ 52/410; 52/747
[58] Field of Search ...................... 52/512, 747, 410; 411/377, 903, 171, 258, 82, 55

[56] References Cited

U.S. PATENT DOCUMENTS

| | | |
|---|---|---|
| 3,179,143 | 4/1965 | Schultz et al. |
| 4,074,501 | 2/1978 | Sandqvist |
| 4,361,997 | 12/1982 | DeCaro |
| 4,380,413 | 4/1983 | Dewey |
| 4,455,804 | 6/1984 | Francovitch |
| 4,467,581 | 8/1984 | Francovitch |
| 4,477,307 | 10/1984 | Cearlock et al. |
| 4,520,606 | 6/1985 | Francovitch |
| 4,545,270 | 10/1985 | Dewey |
| 4,568,215 | 2/1986 | Nelson |
| 4,616,455 | 10/1986 | Hewison |
| 4,620,402 | 11/1986 | Beneze |
| 4,658,558 | 4/1987 | Verble |
| 4,663,910 | 5/1987 | Hasan |
| 4,712,959 | 12/1987 | Hasan |
| 4,716,699 | 1/1988 | Crossman et al. |
| 4,726,164 | 2/1988 | Reinwall et al. |
| 4,727,699 | 3/1988 | Sargent |
| 4,752,171 | 6/1988 | Pliml, Jr. |
| 4,757,661 | 7/1988 | Hasan |
| 4,763,456 | 8/1988 | Giannuzzi |
| 4,780,039 | 10/1988 | Hartman |
| 4,787,188 | 11/1988 | Murphy |
| 4,788,022 | 11/1989 | Sakayori |
| 4,824,304 | 4/1989 | Shibayama et al. ............. 411/171 |

Primary Examiner—John E. Murtagh
Attorney, Agent, or Firm—Foley & Lardner

[57] ABSTRACT

A method of installing a roofing fastener including a screw and a stress plate into a multilayered roofing structure involves bonding the outer surface of the screw to the inner surface of the plate. Such a bond may be formed by spin welding as the screw is installed in the roofing structure. The fastener is thereby installed and bonded in the same operation. A fastener assembly useful in the foregoing method includes a screw and plate having welding surfaces made of a thermoplastic resin.

33 Claims, 4 Drawing Sheets

METHOD FOR INSTALLING A ROOF FASTENER

This application is a continuation-in-part of U.S. Ser. No. 236,542, filed Aug. 25, 1988, now abandoned, and of U.S. Ser. No. 236,666, filed Aug. 25, 1988, now U.S. Pat. No. 4,834,600. The entire contents of the foregoing patent applications are hereby expressly incorporated herein by reference.

FIELD OF THE INVENTION

This invention relates to a method for installing a roof fastener for securing insulation or waterproof membrane, particularly to a method for securing a stress plate to a screw which is inserted successively through the plate, membrane, and insulation, and into the rooftop. The invention further provides a fastener assembly for use in such a method.

BACKGROUND OF THE INVENTION

A variety of screw and plate type fastener systems have been designed for securing successive layers of roof covering materials (e.g., a water impervious membrane overlying a layer of insulation) to rooftops made of steel, gypsum, tectum, or wood. Such systems generally include an elongated screw which penetrates a flat plate (washer). The plate (sometimes referred to as a stress plate) clamps down the roof covering membrane and/or insulation when the screw is tightened in the rooftop and tends to prevent the membrane or insulation from pulling vertically over the head of the screw.

Screw and plate fasteners are most frequently used on commercial buildings having a flat rooftop. In general, a layer of insulation is laid out overlying the roof deck and fastened down with screw and plate fasteners. A sheet of membrane, typically marketed in rolls, is then laid out over the insulation. Fasteners are then installed along the edges of the membrane sheet, the distance from the edge and the distance between fasteners being determined in accordance with the deck and membrane material and anticipated conditions. More specifically, a minimum force which will cause the membrane to tear away from the fastener (or the fastener to pull out of the roof), is prescribed. The number of fasteners per unit linear distance is chosen to ensure that the membrane and/or insulation will be retained.

To install the respective fastener, a pilot hole is, if needed, drilled at the desired location through the roof membrane, insulation, and deck. A plastic or metal screw is placed through a retaining stress plate and then installed in the hole, engaging the roof deck so that the plate is held tightly against the membrane. After the fasteners have been installed along the edge of the first sheet, a successive sheet of membrane is laid out, with one edge overlapping the edge of the first sheet of membrane covering the fasteners. That edge of the successive sheet is bonded (e.g., chemically or by heating) to the preceding sheet. The other edge of the succeeding sheet is fixed to the roof deck by fasteners in the manner previously described. Thus, the roof is covered by overlapping sheets of membrane. The membrane edges along the edges of the roof are fixed by battens or other conventional techniques.

Problems have been encountered with conventional screw and plate fasteners when employed in such rooftop environments. Wind blowing over the membrane tends to create a negative air pressure, which in turn tends to cause the membrane to pull laterally out from the fastener. To militate against the membrane tearing out from under the anchor due to such lateral forces, downwardly directed cleats, lugs, spikes, ribs or other protrusions on the underside of the stress plate, engage the membrane when the screw is tightened in the rooftop. See, for example, Murphy U.S. Pat. No. 4,787,188, issued Nov. 29, 1988 and Reinwall et al. U.S. Pat. No. 4,726,164 issued Feb. 23, 1989. However, over time the screw tends to cease to provide tension relative to the membrane (force holding the plate against the membrane) at the level originally installed. This may happen because the underlying insulation deteriorates and shrinks due to, e.g., harsh weather conditions, wind vibrations and/or because vibrations from within the building cause the screw to back out (unscrew) from the rooftop. These conditions can cause the head of the screw to pop up, i.e., protrude from the surrounding roofing material, which in turn leads to damage to the underlying membrane, insulation and roof. Loss of preload tension can also cause the lugs on the underside of the stress plate to lose engagement with the membrane, making the membrane more susceptible to pull out due to lateral forces.

Various combinations of metal screws with plastic plates have been proposed for use as roofing anchors. See, for example, DeCaro U.S. Pat. No. 4,361,997 issued Dec. 7, 1982, Hartman U.S. Pat. No. 4,780,039, issued Oct. 25, 1988, Dewey U.S. Pat. Nos. 4,380,413 and 4,545,270, issued Apr. 19, 1983 and Oct. 8, 1985, respectively and Hasan U.S. Pat. Nos. 4,663,910, issued May 12, 1987, 4,712,959, issued Dec. 15, 1987, and 4,757,661, issued July 19, 1988. However, metal screws present an additional problem; they tend to corrode when used in metal decks.

A number of mechanical systems have been proposed for preventing separation of the screw from the plate in such fasteners. Back out can be prevented by preventing the screw from turning (in a reverse direction) relative to the roof. This could be accomplished with a broad headed screw having lugs, spikes, ribs or the like on the underside of the head to engage the membrane and prevent counter-rotation. However, rotation of the lugs, etc., during installation would tend to tear or otherwise damage the membrane. Accordingly, fastener systems have been proposed including a plate with anti-rotation structure which engages the membrane, e.g., spikes (which also militate against lateral pull out of the membrane), a separate screw, and a mechanism to prevent counter-rotation of the screw relative to the plate. Such a system is described in the aforementioned Dewey U.S. Pat. No. 4,380,413. Projecting pawls on the head of a screw, cooperate with projections on a plate as a ratchet system to prevent rotation to effect installation but prevent counter-rotation between the plate and screw. Projecting structures on the underside of the plate engage the roofing material to prevent rotation of the plate relative to the roof.

A similar system employing a ratchet mechanism to prevent the screw from backing out is also described in Giannuzzi U.S. Pat. No. 4,763,456, issued Aug. 16, 1988. However, these various ratchet structures tend to give the fastener assembly an undesirably high profile, and may be susceptible to disengagement due to loss of tension, or failure due to breakage of the ratchet members, due to, e.g., overtightening or undertightening during installation. Other systems employ a threaded connection between the plate and fastener. For example, the aforementioned DeCaro U.S. Pat. No.

4,361,997, describes a fastener with upper and lower sets of threads with an intervening unthreaded area which cooperates with a stress plate bearing anti-rotation structures on its underside. The lower set of threads are threaded through the plate at the job site with the use of a special tool prior to installation. The upper threads engage the plate after the screw is substantially turned into the roofing deck. The anti-rotation structures engage the roof membrane and prevent the plate from turning.

Other systems have been proposed employing a cap over the head of the fastener (see, e.g., Verble U.S. Pat. No. 4,658,558, issued Apr. 12, 1987; Frankovitch U.S. Pat. No. 4,520,606, issued June 4, 1985; Beneze U.S. Pat. No. 4,620,402, issued Nov. 4, 1986) or resilient spring mechanisms to maintain tension (see, e.g., Hewison U.S. Pat. No. 4,616,455, issued Oct. 14, 1986). Application of a bonding or sealing agent over the head of a fastener, between a stress plate and the membrane, or both has also been proposed. See Sandquist U.S. Pat. No. 4,074,501, issued Feb. 21, 1978, and Frankovitch U.S. Pat. Nos. 4,455,804 and 4,467,581, issued June 26, 1984 and Aug. 28, 1984, respectively. Still other systems rely on a nut or similar element disposed on the lower end of the screw beneath the rooftop to hold the fastener in place. See Sargent U.S. Pat. No. 4,727,699, issued Mar. 1, 1988. These fasteners are only partly effective in preventing the fastener from backing out, and require additional structure for that purpose.

Roofing fastener systems with provisions for preventing the head of the screw from protruding beyond the top of the plate, e.g., in the event of loss of installation tension, have also been proposed. For example, such a system, wherein the washer includes a flexible ring about the aperture that receives the screw, is described in Dewey U.S. Pat. No. 4,380,413. Another such system employing a plastic washer having a resilient rib which engages the screw head to hold it down is described in the aforementioned Hasan U.S. Pat. Nos. 4,712,959 and 4,757,661.

A need remains, however, for a roof fastening system that provides a high pull out value, simplicity in structure, and which can be easily and simply installed without requiring special tools.

Friction welding techniques, such as spin-welding, are generally known and have been used to secure plastic members together. In particular, friction welding has been proposed as a means for securing construction fasteners. See Cearlock et al. U.S. Pat. No. 4,477,307, issued Oct. 16, 1984, Pliml, Jr. U.S. Pat. No. 4,752,171, issued June 21, 1988, Crossman et al. U.S. Pat. No. 4,716,699, issued Jan. 5, 1988, and Nelson U.S. Pat. No. 4,568,215 issued Feb. 4, 1986.

In general, precoating of fastening devices with non-blocking, solid, latent curing polymerizable adhesives activated by heat and/or pressure also has been suggested. Schultz et al., U.S. Pat. No. 3,179,143 describes a metal fastener precoated with an adhesive, with one coactant separated from another by encapsulation in microscopic capsules which rupture under pressure when the fastener is tightened. Such adhesives, however, contemplate pressures generated by metal or metal abutment surfaces when installed or activation through a separate heating step.

Anti-corrosion coatings for screws and bolts are also known. In addition, partially plastic coated waterproof screws have been proposed. See, for example, Sakayori et al. U.S. Pat. No. 4,788,022, issued Nov. 29, 1988. The present invention utilizes these and other techniques to address the various drawbacks of known roof fastener systems as described above.

SUMMARY OF THE INVENTION

The invention, in one aspect, provides a method of installing a roofing fastener including a fastener and stress reliever, e.g., screw and a spiked stress plate, which involves forming a bond between an outer surface of the screw and an inner surface of the plate during installation. Such a bond may be formed by a variety of techniques such as friction welding, ultrasonic welding, or by applying an adhesive to the fastener assembly. Bonding effected through the interaction of the screw and stress plate, e.g., relative rotation during installation, is particularly useful for this purpose because the screw can be installed and bonded in the same operation. Such techniques include, for example, use of a heat activated adhesive which is set by friction generated heat, and spin welding, a form of friction welding.

Spin welding, which requires no adhesive, is particularly advantageous. Upon spin-welding of the fastener screw to the stress plate, the plate effectively becomes part of (fused with) the screw to form a unitary roof fastener having an enlarged flange which acts as the stress reliever. The thus-formed fastener may in addition have gripping spikes on its underside, a feature which cannot effectively be provided on a prefabricated large-flanged fastener because the spikes would tear the underlying roofing material as the fastener rotates during installation.

Another aspect of the invention further provides a fastener assembly useful in the foregoing method including a screw made of, or coated with, a first plastic, in combination with a stress plate having an aperture. At least the inner surface of the aperture is made of a second plastic. The first and second plastics are sufficiently compatible so that a satisfactory weld is formed therebetween by spin-welding.

Still another aspect of the present invention provides a roofing fastener for use in metal decks that is particularly resistant to corrosion.

BRIEF DESCRIPTION OF THE DRAWING

The invention will be further described with reference to the accompanying drawing, wherein like numerals denote like elements, and.

DETAILED DESCRIPTION OF PREFERRED EXEMPLARY EMBODIMENTS

Figure 2:
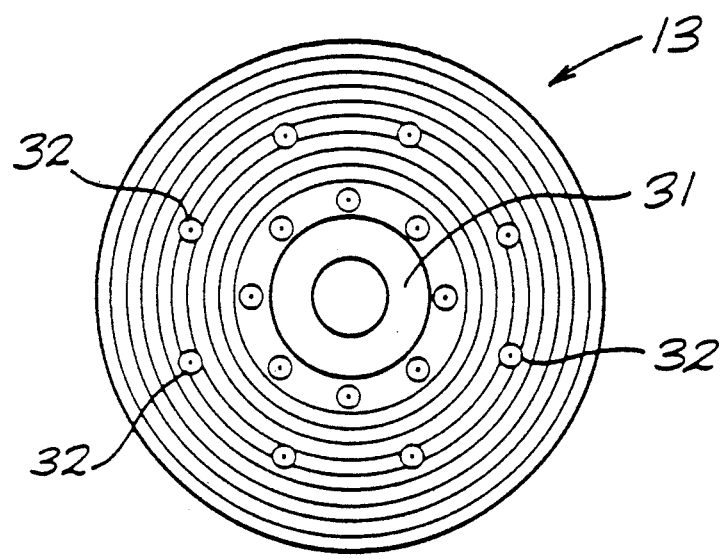
FIG. 2 is a bottom plan view of the plate shown in FIG. 1.
Figure 1:
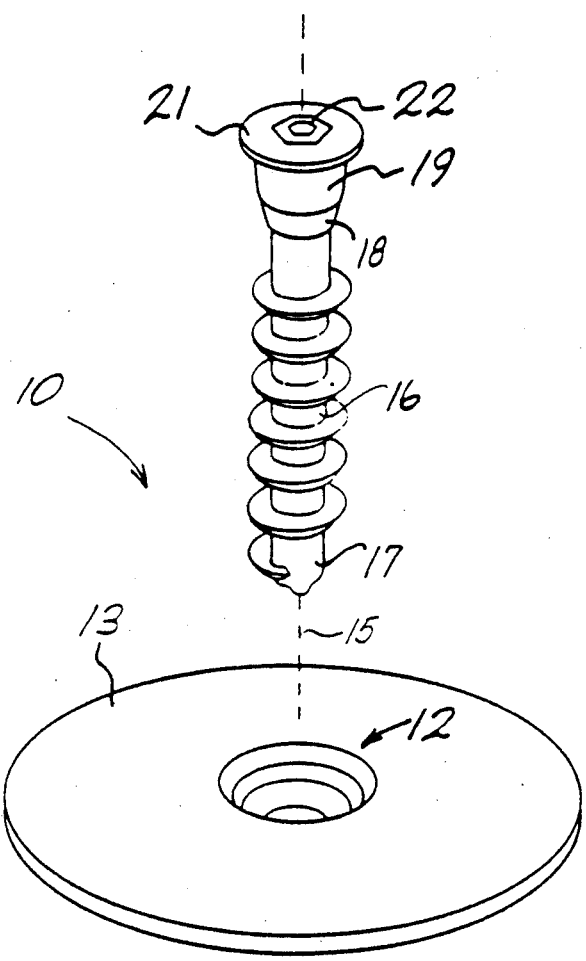
FIG. 1 is an exploded perspective view of a fastener assembly comprising a first embodiment of invention.
Figure 3:
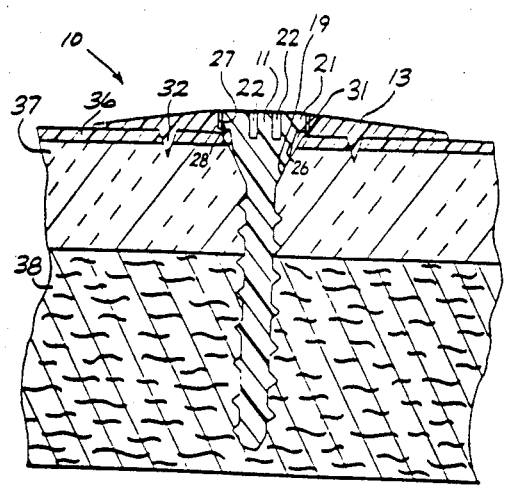
FIG. 3 is a sectional view of the fastener assembly of FIG. 1, shown installed in a roof structure.

Referring now to FIGS. 1 through 3, a fastener assembly 10 according to the invention includes a large-threaded plastic screw 11 configured for insertion through a central hole 12 of a stress reliever 13, suitably a disk-shaped stress plate. For purposes of the present invention, the term "stress reliever" includes disks, plates, battens, elongated strips secured by multiple fasteners, and similar devices designed for use with a roof fastener to spread stress on the underlying roof structure over a board area. Screw 11 has an elongated body 16 disposed about a longitudinal axis 15.

Body 16 is suitably at least partially threaded, and ends in a tapered point 17 suitable for boring through relative soft roof materials such as structural cement wood fiber deck, e.g., tectum. The thread height of threaded body 16 is preferably at least about ⅛ inch (about 0.32 cm), particularly ⅛ to ¼ inch (0.32–0.64 cm) to obtain suitable holding strength in the soft roof material. Directly above body 16, screw 11 has a frustoconical shoulder 18 that tapers outwardly at an angle of at least about 30 degrees. Shoulder 18 aids in centering screw 11 in hole 12. A second, suitably slightly frustoconical surface 19 (welding surface 19) immediately above shoulder 18 serves as a primary surface for spin welding or adhesion, as described hereafter. Welding surface 19 may, alternatively, be cylindrical. Screw 11 ends in a head 21 having an peripheral flange 22 and a hexagonal recess 23 in its flat end surface. A suitable tool, such as a rotary drill, engages recess 23 during installation of screw 11.

Stress plate 13 is preferably round, although other shapes may be employed. Hole 12 is round in cross section and extends completely through plate 13 at its center. In the illustrated embodiment, hole 12 has a slightly frustoconical lower end 26 and a cylindrical upper end (counterbore) 27 of larger diameter which together define a generally horizontal step 28 (see FIG. 3). Upper end 27 of hole 12 defines a recess which is large enough so that flange 22 fits mostly or entirely therein, whereby the underside of flange 22 engages step 28. Specifically, the diameter of upper end 27 is slightly greater than the diameter of screw flange 22, to accommodate a minor misalignment in inserting screw 11. Similarly, lower frustoconical end (surface) 26 of hole 12 is geometrically similar to welding surface 19 of screw 11, so that surface 19 fits closely therein.

Lower end 26 of hole 12 is preferably slightly smaller in overall diameter than welding surface 19 so that a slight interference fit is obtained upon complete insertion of screw 11 into hole 12. This interference fit promotes friction during installation to, e.g., induce spin-welding. Specifically, the relative diameter of welding surface 19 and lower end 26 of hole 12 (i.e., the interference fit) are preferably chosen to ensure a minimum pressure of surface 19 against surface 26. This tends to lessen the sensitivity of the weld to variations in downward pressure by the operator. This is particularly true where surfaces 19 and 26 are cylindrical in shape. Thus, for the foregoing purposes, it is generally preferred that lower end 26 of hole 12 have an overall diameter from about 0 to 0.01 inch (0–0.025 cm) than the corresponding diameter of welding surface 19 of screw 11. An excessively tight interference fit may cause the plate to spin together with the screw, notwithstanding the action of the spikes 32 as described below.

Referring to FIG. 2, the underside of plate 13 may, if desired, include a central frustoconical projection 31 centered on hole 12 to provide a surface to coact with shoulder 18 of screw 11. In practice, however, projection 31 about the periphery of hole 12 is typically omitted, and shoulder 18 extends beyond the bottom surface of plate 13. A plurality of cleats (spikes) 32 disposed in an array about hole 12 extend from the underside of plate 13.

FIG. 3 illustrates fastener 10 as installed through successive layers of waterproof membrane 36, such as rubberized fabric, thermal insulation 37, and tectum deck material 38. According to the method of the invention, fastener 10 may be installed in a single step by rotating screw 11 at high speed with downward pressure using, for example, a depth sensing electric screw gun, so that screw 11 bores rapidly through layers 36, 37 and 38. Plate 13 is disposed on membrane 36, spike side-down, and receives screw 11 through hole 12. As welding surface 19 comes into frictional contact with the surface of lower end 26 of hole 12, heat is generated which melts plastic on one or both of the inner surface of hole 12 and welding surface 19. Friction welding may also occur at the same time between flange 21 and step 28, i.e., spin welding may be conducted on horizontal and vertical surfaces. At the same time, spikes 32 engage membrane layer 36 so that plate 13 does not substantially rotate relative to screw 11. Spikes 32 thereby serve dual functions of securing the plate during spin welding and securing membrane 36 beneath plate 13 after installation is completed (see FIG. 3).

Screw 11 and plate 13 are configured so that heat generation (and, thus, spin welding) occurs only during the last segment of the insertion of screw 11. Thereafter, rotation of screw 11 is abruptly stopped so that a secure weld will form. The height of spikes 32 affects the length of the final segment of rotation, i.e., the number of rotations of screw 11 that will occur before screw 11 is completely installed. Spikes 32 having lengths of at least ⅛ inch, especially in the range of about ⅛ to ½ inch (about 0.3–1.3 cm) are generally sufficient for this purpose. In general, the screw and plate should be configured so that at least one complete revolution of screw 11 occurs during the final segment of installation as spikes 32 engage membrane 36. Often, absent spikes 32, a screw-and-plate combination will tighten down in less than one revolution of the screw, so that the heat needed for spin-welding may not be sufficiently generated.

An important factor in the heat generation (spin-welding) portion of the installation step is the distance travelled by the outer periphery of welding surface 19 per unit time. This will depend on both the average outer diameter of surface 19 and the speed (rpm) of rotation of screw 11. The specific plastics from which screw 11 and plate 13 are made also affect the spin welding process. Although many combinations of thermoplastic materials could potentially be used, the plastic must be sufficiently strong to function as a roof fastener, yet have a melting point sufficiently low so that the plastic will melt at spin welding speeds achievable with a conventional drill gun.

In general, screw 11 and plate 13 are preferably made of the same plastic material, or at least of the same general type of plastic. This promotes a stronger welded bond between the parts. Thermoplastic resins useful as the fastener or stress reliever according to the invention should have surface friction characteristics sufficient to cause melting of a surface portion of the resin upon spin-welding of the stress reliever relative to a fastener under conventional spin-welding conditions, preferably at spin-welding peripheral surface speeds in the range of about 10 to 100 feet per second during from about 1 to 10 revolutions of the fastener. Fastener insertion speeds in the range of approximately 800 to 1200 feet/minute at drill gun speeds of 1000 rpm or more are effective for spin welding a typical screw and plate combination according to the invention. The strength of the resin should not be substantially affected by outdoor rooftop conditions, i.e., by moisture or temperatures in the range of about −30° F. to 150° F. (−34° to 66° C.).

Specific plastics useful for fabricating the fastener and stress plate of the invention include both thermoplastic and thermosetting resins, which may be modified or contain reinforcing fillers such as glass fibers. Thermoplastic resins are particularly preferred, especially polyamide, polyester, polyphenylene oxide (PPO), polyethylene, polypropylene, and polycarbonate resins, and blends thereof. Nylon materials, such as heat-stabilized or impact-modified nylon 66, can be used. However, polyethylene, polycarbonate, polyester, PPO and blends thereof are particularly preferred because, unlike nylon, these plastics generally do not lose their ability to spin-weld if they become wet. Glass or talc-filled polypropylene and glass-filled nylon materials may also be employed, but these materials typically have higher melting points and may prove difficult to spin-weld.

Thermoplastic resins useful in the present invention preferably have a specific gravity in the range of about 1.1 to 1.5 (especially as determined by ASTM test method D792), a tensile yield strength of at least about 1,000 psi (7 MPa) per ASTM D638, preferably at least 7,000 psi (48 MPa) at temperatures up to about 50° C., a Vicat softening temperature of at least about 155° C., (ASTM D1525) and water absorption not greater than about 1% at equilibrium and not greater than about 0.5% at 24 hours (23° C., ASTM D570). For optimum spin-welding properties, the resin is preferably amorphous and should be substantially free of moisture and lubricants.

If glass-filled nylon is used for fabricating screw 11 to provide additional strength, however, spin welding conditions must be suitably adjusted to permit the glass filled nylon to melt, especially if the nylon used to make plate 13 is not glass filled. In the alternative, welding surface 19 may be provided with a suitable rib or recess, e.g., an annular rib, into which melted plastic from plate 13 flows during welding. In this manner plate 13 becomes mechanically interlocked with screw 11, in addition to being fully or partially friction welded thereto.

Plate 13 may also have a thin, upright, annular collar which extends upwardly from the upper surface of lower end 26 of hole 12 and has essentially the same diameter as the upper end of lower end 26. The underside of flange 21 engages this collar as screw 11 is driven into the roof structure and flattens it, providing additional plastic material for spin-welding.

In another embodiment of the present invention, surface 19 of screw 11 and/or the surface of lower end 26 of hole 12 are coated with a suitable heat activated adhesive. As in the case of a spin-weld bond, screw 11 is rotated at high speed to bore through layers 36, 37 and 38, surface 19 ultimately comes into frictional contact with lower end 26 of hole 12. The heat generated by rotation of surface 19 against lower end 26 of hole 12 is sufficient to cause the adhesive to set. Thus, an adhesive bond between screw 11 and cleated plate 13 is formed without the pressures provided by metal-to-metal abuttment surfaces, or a separate heating step.

Referring now to FIGS. 4A-4C and 5, an alternative embodiment of the invention utilizes a plastic-coated metal screw 41 instead of an all-plastic screw. Metal screws are preferred for installation into metal roof decks, but tend to corrode, pop-up and back out. Metal surfaces are also generally unsuitable for spin welding to a plastic disk because most thermoplastics adhere poorly to metal surfaces. Screw 41 is suitably a standard steel screw have a threaded body 42 ending in a tapered drill point 43, and a rounded head 44 of greater diameter than body 42. Head 44 has an upwardly opening recess 46 therein, such as a cross-shaped Phillips recess, suitable for engagement with the screw gun. Screws having other types of points, e.g., a chisel point, or head configuration, e.g., hex head, can, of course, be employed.

Figures 4A, 4B, 4C:
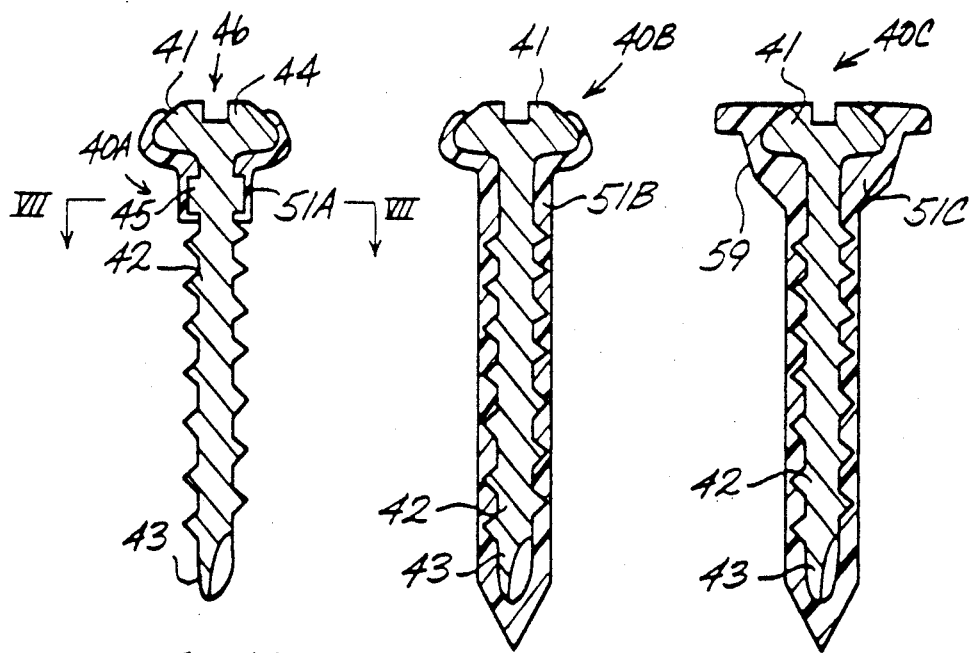
FIGS. 4A, 4B and 4C are lengthwise sectional views of three embodiments of plastic-coated fasteners according to aspects of the invention.
Figure 7:
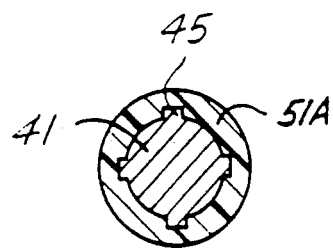
FIG. 7 is a cross-sectional view taken along the line VII—VII in FIG. 4A.

In FIGS. 4A and 7, a fastener 40A includes screw 41 partially encapsulated in a tubular plastic sheath 51A which covers most of head 44 and an upper, preferably unthreaded portion of body 42. The unthreaded upper portion of body 42 adjoining head 44 has a series of radially diverging projections 45 which prevent sheath 51A from breaking loose from screw 41 as screw 41 is rotated. Sheath 51A has an upper opening therein so that recess 46 remains uncovered. Sheath 51A renders fastener 40A spin-weldable, but does not protect body 42 from corrosion.

Figure 5:
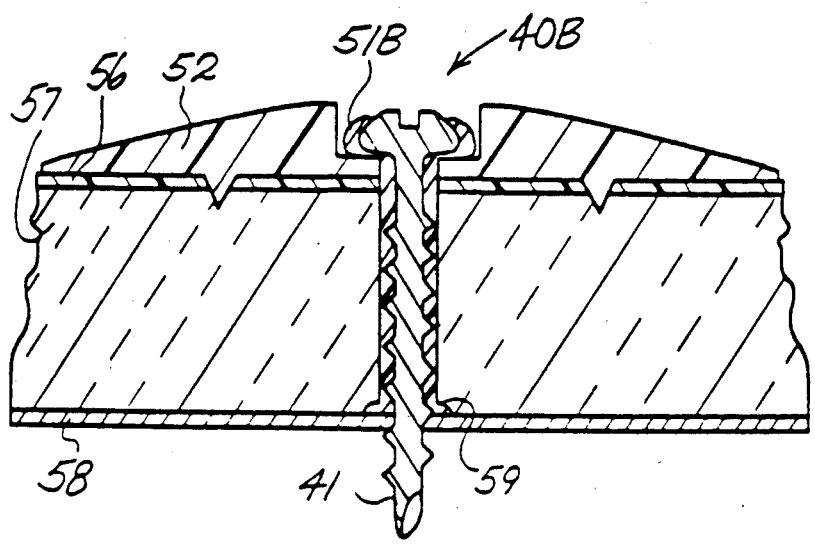
FIG. 5 is a sectional view of the screw of FIG. 4B shown installed in a roof structure.

Referring to FIGS. 4B and 5, a fastener 40B includes screw 41 and a sheath 51B. Sheath 51B is identical to sheath 51A, except that it covers the entire length of body 42 and also point 43. In this manner, body 42 is protected from corrosion which apparently occurs due to electrical interaction between a metal roof deck and the screw. FIG. 5 illustrates fastener 40B installed through a stress plate 52, a membrane 56, a layer of insulation 57, and a steel deck 58. Plate 52 is preferably made of a plastic which spin-welds with the plastic of sheath 51B and may be of substantially the same configuration as plate 13, except that its central hole will typically be narrower (smaller diameter). Fastener 40B is spin welded to a stress plate 52.

Plastic removed from point 43 and the lower end of body 42 during insertion of fastener 40B through deck 58 accumulates, e.g. as a bead 59, on the upper surface of metal deck 58, tending to seal the aperture in deck 58 in which screw 41 is received and providing additional protection against corrosion. If a sufficiently low melting plastic is employed in the lower portion of sheath 51B covering point 43, such as low-melting polypropylene, such plastic will melt during spin-welding and then solidify upon cooling to form a unitary bead 59 which seals the hole deck 58 from moisture.

The embodiment of FIGS. 4B and 5 can also be utilized without spin welding sheath 51B to plate 52. The resulting fastener will resist corrosion better than conventional roofing fasteners and may have sufficient strength and back-out resistance for some types of installations.

FIG. 4C illustrates a further embodiment wherein fastener 40C includes screw 41 and a sheath 51C. Sheath 51C is substantially the same as sheath 51B, except that the portion thereof surrounding head 44 has a larger diameter to provide a higher rate of insertion (determined from the peripheral velocity of its welding surface 59 and the rotation speed of the drill.) This embodiment also has a larger welding surface and will generally form a stronger bond with the associated plate, which has a suitably enlarged central hole. If desired, head 44 may be completely encapsulated, and a recess for installation may be provided in the plastic sheath. In addition, the embodiments of FIGS. 4B and 4C may be provided with projections similar to projections 45, if needed to prevent disengagement of sheaths 51B, 51C with screw 41.

Figure 6:
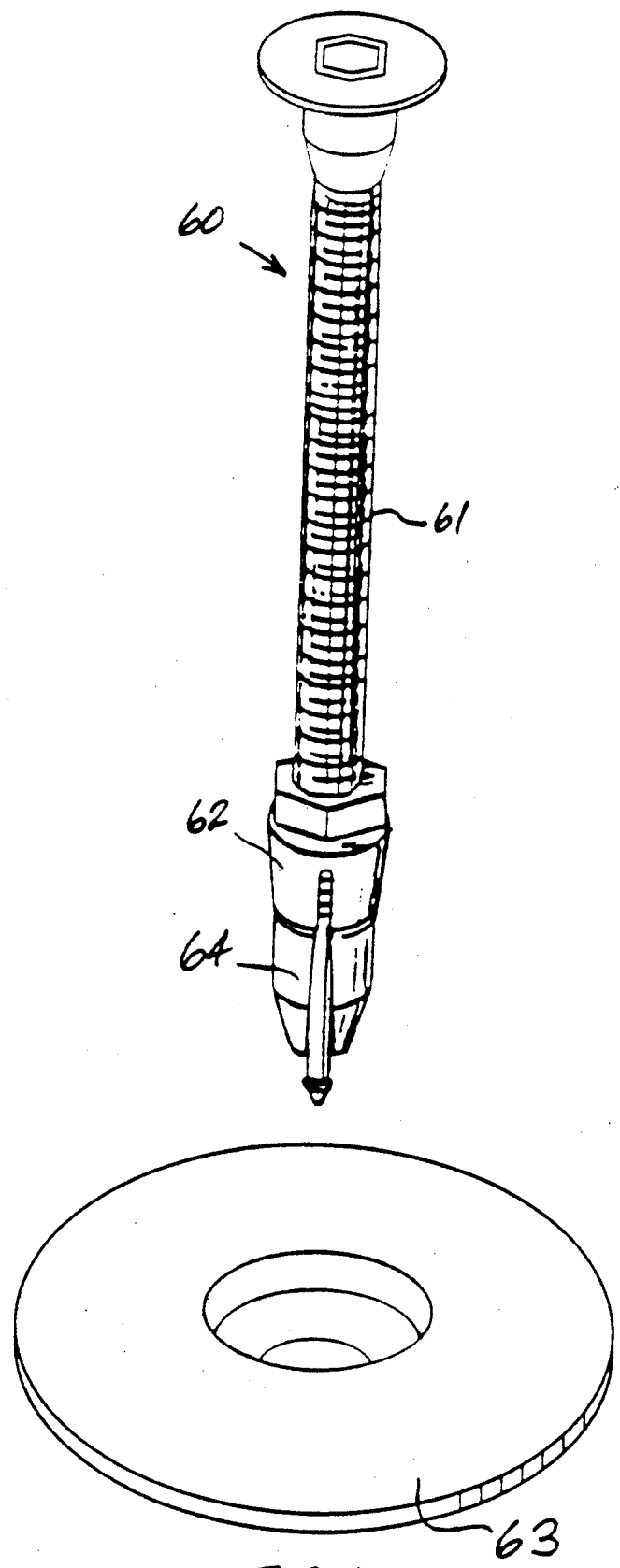
FIG. 6 is an exploded perspective view of an alternative embodiment of the invention wherein the fastener further includes a nut which anchors the fastener assembly to the roof deck.

FIG. 6 illustrates a further embodiment of the invention wherein a fastener 60 includes a plastic, flat-threaded bolt 61, a nut 62 threadedly coupled with bolt 61, and a plate 63 similar to plate 13 described above. The upper end of bolt 61 is virtually the same as the upper end of plastic screw 11, and spin-welds to plastic plate 63 in the same manner. To install fastener 60, plate 63 and nut 62 are placed onto bolt 61 as shown, and the assembly inserted in a hole predrilled through the roof covering materials and metal deck. Nut 62 engages the hole in the deck and has legs 64 that spread out when the midsection of nut 62 is compressed between a tapered lower end portion of bolt 61 and the wall of the hole in the deck. The structure of bolt 61 and nut 62 is more fully described in copending application Ser. No. 236,666, filed Aug. 25, 1988. The relationship between bolt 61 and nut 62 is such that legs 64 are substantially spread prior to engagement of the welding surfaces of bolt 61 and plate 63. In this manner the method of the invention may be used with this and other similar fastener systems which utilize expandable elements to anchor the fastener to the deck.

Figure 8:
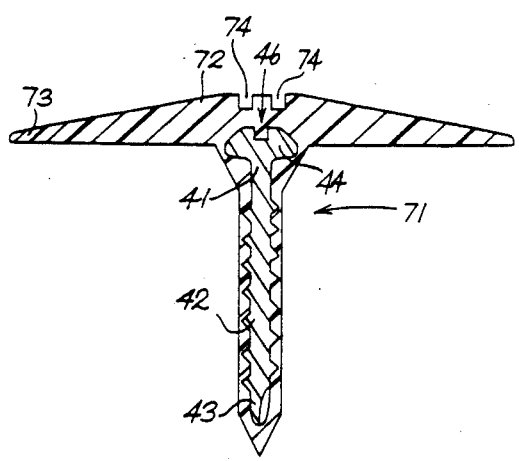
FIG. 8 is a lengthwise sectional view of a plastic-coated screw according to the invention having an enlarged, stress relieving flange.

FIG. 8 illustrates an additional embodiment of a fastener 71 wherein screw 41 is completely encapsulated with a plastic sheath 72. Sheath 72 is similar to sheaths 51A-51C except that sheath 72 has an enlarged lateral flange 73 which acts as the stress reliever. If flange 73 has an excessively small diameter it will not function as an effective stress reliever. For this purpose, flange 73 has a diameter of at least about one inch (about 2.5 cm), preferably 1.5-2.5 inches (about 3.8-6.4 cm). Screw head 44 is completely covered, so that recess 46 acts in a manner similar to projections 45 to prevent disengagement of sheath 72 from screw 41. If desired, however, head 44 could be eliminated, and comparable means such as projections similar to projections 45 (FIG. 7) could be used if needed to prevent sheath 72 from becoming disengaged with screw 41. Sheath 72 has a central hexagonal recess 74 in its upper surface so that fastener 71 may be installed with the same drill gun used to install the large-threaded screw shown in FIGS. 1 and 3.

The method of the invention provides a number of advantages over known methods for installing roof assembly fasteners. Since the installing and spin-welding steps can be carried out as a single operation, the method of the invention is simple and economical. The screw and plate can be made of commonly available thermoplastic resins, and do not require special structures to prevent the screw from unscrewing (backing out). The cleats on the bottom of the plate facilitate spin welding and also help prevent the membrane from tearing loose or fluttering. A fastener installed according to the invention can also prevent the loss of the preloaded tension under which the fastener is installed. Specifically, the fastener is preferably installed so that the underlying roofing layers, i.e. the membrane and the insulation, are compressed between the stress plate and the roof. The amount of compression will vary, but maintaining such compression is important in preventing damage to the roof system.

It will be understood that the foregoing description is of preferred exemplary embodiments of the invention, and that the invention is not limited to the specific forms shown. Modifications may be made in the design and arrangement of the elements without departing from the scope of the invention as expressed in the claims.

I claim:

1. A method of installing a roofing structure on a roof, said method employing a roofing fastener including a plate and a screw having a threaded body and an enlarged diameter flanged head, said screw being received through a stepped hole in said plate, comprising:
   rotating said screw to effect engagement with said roof so that said plate is tightened down against said roofing structure, and said threaded body passes through said roofing structure and engages said roof;
   by frictional interaction of said screw and plate during a final segment of said rotating step, spin-welding a surface of said screw with a surface of said plate to secure said screw and said plate against said roofing structure; and
   abruptly stopping rotation of said screw, whereupon said flanged head of said screw engages said step of said hole.

2. The method of claim 1, wherein said plate has means for restricting rotation of said plate relative to said screw during spin-welding for at least about one complete revolution of said screw.

3. The method of claim 2, wherein said restricting means comprises a plurality of spikes extending from the underside of said plate having lengths in the range from about ⅛ to ½ inch.

4. The method of claim 1, wherein said surfaces of said screw and said plate which undergo spin-welding are made of a thermoplastic resin.

5. The method of claim 4, wherein said resin is selected from the group consisting of polyamide, polyester, polyphenylene oxide, polethylene, polypropylene, polycarbonate, and blends thereof.

6. The method of claim 5, wherein said screw and said plate are made of said thermoplastic resin.

7. The method of claim 4, wherein said screw comprises a metal screw partially coated with a sheath of said thermoplastic resin.

8. The method of claim 4, wherein said welding surface of said plate includes a reduced diameter portion of said hole adjacent said step, and said welding surface of said screw includes a portion of said screw adjacent said flange which has a slightly greater diameter than said reduced diameter portion of said hole.

9. The method of claim 1, wherein said roof comprises a generally flat roof deck.

10. The method of claim 9, wherein said roofing structure comprises a waterproof membrane covering said roof deck, such that, in said rotating step, said screw penetrates said deck and said plate is tightened down against said membrane.

11. The method of claim 10, wherein said deck is made of gypsum, tectum, or wood.

12. The method of claim 10, wherein said membrane is made of a waterproof rubberized fabric.

13. The method of claim 10, wherein said roofing structure further comprises a layer of thermal insulation interposed between said roof deck and said membrane.

14. The method of claim 1, wherein said roof is a metal roof deck, and said screw comprises a metal screw at least partially coated with a thermoplastic resin proximate said flanged head and having a point configured to drill through said metal deck, and wherein said surface of said screw which undergoes spin-welding is the exterior surface of said thermoplastic resin.

15. A roof installation comprising a roofing structure secured to a roof by the method of claim 1.

16. A method of fastening a roofing membrane to an underlying roof, comprising the steps of:
   disposing a fastener through an aperture in a stress reliever;
   rotating at least a portion of said fastener to cause said fastener to penetrate the roofing membrane, engage said roof, and bias said stress reliever against said membrane; and
   bonding a surface of said fastener to a surface of said stress reliever by bringing said fastener surface into frictional contact with said stress reliever surface during said rotating step to generate sufficient heat to cause at least one of said fastener and stress reliever surfaces to at least partially melt.

17. The method of claim 16, wherein said bonding step comprises frictionally welding said fastener surface to said stress reliever surface.

18. The method of claim 16, wherein said fastener surface and said stress reliever surface are disposed to come into frictional contact at a predetermined position prior to complete engagement between said fastener and said roof.

19. The method of claim 16, wherein said surface of said stress reliever is an interior surface of said aperture and said surface of said fastener is an exterior surface of a body portion of said fastener, which body portion extends through said aperture, and said bonding step further comprises bringing said exterior fastener surface received within said stress reliever aperture into frictional contact with said interior surface of said aperture.

20. The method of claim 19, wherein said bonding step includes the step of applying a minimum pressure biasing said exterior fastener surface and said interior surface of said aperture against each other during said rotating step.

21. The method of claim 17, wherein said aperture is of predetermined dimensions and said exterior fastener surface is of slightly greater dimensions than said aperture, and said pressure applying step further comprises inserting said exterior fastener surface of greater dimensions into said aperture.

22. The method of claim 19, wherein said exterior fastener surface and said interior surface of said aperture are frustoconical.

23. The method of claim 19, wherein said exterior fastener surface and said interior surface of said aperture are cylindrical.

24. A roof installation comprising a roofing membrane secured to an underlying roof by the method of claim 16.

25. The method of claim 16, wherein said roof is a generally flat roof deck.

26. The method of claim 25, wherein said roof deck is made of gypsum, tectum, or wood.

27. The method of claim 25, wherein said roof deck is made of metal.

28. The method of claim 16, wherein said membrane is made of a waterproof rubberized fabric.

29. The method of claim 25, wherein said membrane is made of a waterproof rubberized fabric.

30. The method of claim 16, wherein said stress reliever is a plate.

31. The method of claim 30, wherein said plate includes protrusions on the underside thereof to facilitate engagement with said membrane.

32. The method of claim 16, wherein said fastener is a screw, and said rotating step comprises rotating said screw to threadedly engage said roof.

33. The method of claim 16, wherein said fastener includes a screw and a nut, said nut being disposed to engage said roof and said rotating step comprises rotating said screw to advance said screw relative to said nut.

* * * * *